US009950846B2

(12) United States Patent
Kimura et al.

(10) Patent No.: US 9,950,846 B2
(45) Date of Patent: Apr. 24, 2018

(54) LAMINATE, MANUFACTURING METHOD AND SHAPED CONTAINER

(71) Applicant: TOPPAN PRINTING CO., LTD., Tokyo (JP)

(72) Inventors: Mitsuharu Kimura, Tokyo (JP); Yumiko Oomori, Tokyo (JP); Kosuke Shimizu, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/030,568

(22) Filed: Sep. 18, 2013

(65) Prior Publication Data

US 2014/0017430 A1    Jan. 16, 2014

Related U.S. Application Data

(63) Continuation-in-part of application No. PCT/JP2012/056314, filed on Mar. 12, 2012.

(30) Foreign Application Priority Data

Mar. 18, 2011 (JP) ................................ 2011-060272

(51) Int. Cl.
*B65D 65/42* (2006.01)
*B65D 65/40* (2006.01)
(Continued)

(52) U.S. Cl.
CPC ............. *B65D 65/42* (2013.01); *B32B 27/32* (2013.01); *B65D 65/40* (2013.01); *C08J 7/042* (2013.01);
(Continued)

(58) Field of Classification Search
CPC .......... B65D 65/42; B65D 65/40; B05D 1/38; B05D 7/52; B05D 2201/04; C09D 1/00;
(Continued)

(56) References Cited

U.S. PATENT DOCUMENTS

2010/0316863 A1    12/2010 Kumamoto et al.
2013/0000512 A1*    1/2013 Saiki .................... C08J 3/05
106/164.3

FOREIGN PATENT DOCUMENTS

EP    2 184 299 A1    5/2010
JP    A-2007-210208    8/2007
(Continued)

OTHER PUBLICATIONS

International Preliminary Report on Patentability dated Sep. 24, 2013 in corresponding International Patent Application No. PCT/JP2012/056314.
(Continued)

*Primary Examiner* — Robert S Walters, Jr.

(57) ABSTRACT

Provided is a laminate having at least a base material and a fine cellulose layer which includes fine cellulose having a carboxyl group, the laminate characterized in being obtained by laminating two or more of the fine cellulose layer. Also provided is a method for manufacturing a laminate, comprising the steps of (1) coating the base material with a liquid dispersion that includes fine cellulose having a carboxyl group, (2) forming a fine cellulose layer by drying the liquid dispersion used for coating, and (3) laminating fine cellulose layers by repeating steps (1) and (2).

10 Claims, 1 Drawing Sheet

(51) Int. Cl.
*C09D 1/00* (2006.01)
*C08J 7/04* (2006.01)
*B32B 27/32* (2006.01)
*B32B 37/24* (2006.01)

(52) U.S. Cl.
CPC ............... *C08J 7/045* (2013.01); *C09D 1/00* (2013.01); *B32B 2037/243* (2013.01); *B32B 2553/00* (2013.01); *C08J 2323/12* (2013.01); *C08J 2367/02* (2013.01); *C08J 2401/02* (2013.01); *Y10T 428/1372* (2015.01); *Y10T 428/24975* (2015.01); *Y10T 428/249924* (2015.04); *Y10T 428/3179* (2015.04); *Y10T 428/31978* (2015.04)

(58) Field of Classification Search
CPC ........ C08J 7/042; C08J 7/045; C08J 2323/12; C08J 2367/02; C08J 2401/02; B32B 27/32; B32B 2037/243; B32B 2553/00; Y10T 428/24975; Y10T 428/1372; Y10T 428/31978; Y10T 428/3179; Y10T 428/249924

USPC ...................................................... 427/385.5
See application file for complete search history.

(56) References Cited

FOREIGN PATENT DOCUMENTS

| | | |
|---|---|---|
| JP | A-2009-57552 | 3/2009 |
| JP | A-2010-125814 | 6/2010 |
| JP | A-2010-155363 | 7/2010 |

OTHER PUBLICATIONS

International Search Report issued in International Patent Application No. PCT/JP2012/056314 dated May 29, 2012 (with translation).

Extended European search report dated Sep. 17, 2014 in corresponding European Patent Application No. 12760465.0.

\* cited by examiner

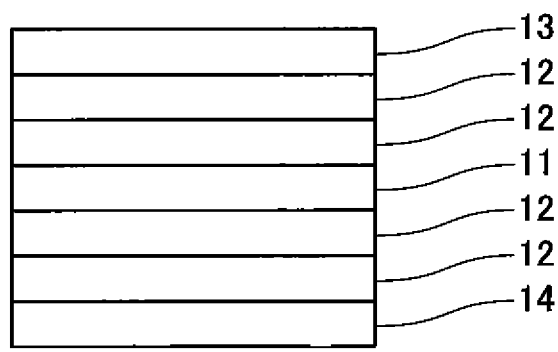

LAMINATE, MANUFACTURING METHOD AND SHAPED CONTAINER

This is a Continuation-in-Part of Application No. PCT/JP2012/056314 filed Mar. 12, 2012, which claims the benefit of Japanese Patent Application No. 2011-060272 filed Mar. 18, 2011. The disclosure of the prior applications is hereby incorporated by reference herein in their entirety.

TECHNICAL FIELD

The present invention relate to a laminate, a method for manufacturing it, and a shaped container.

BACKGROUND ART

Highly effective gas barriers are required for containers and packaging of food products, toiletry products, drugs, medical supplies, electronic members etc., for protecting the contents. Most currently used gas barriers are things manufactured from chlorine based materials such as polyvinylidene chloride, and things manufactured by evaporating inorganic material, so that they emit enormous amounts of carbon dioxide and heat at manufacturing or disposing. Furthermore, chlorine-based materials have a problem in that dioxin is generated from them, and evaporated inorganic films have some problems in that they can damage an incinerator on burning, removal of the film is required for recycling, and so on. Therefore, gas barrier materials are desired to be converted to eco-friendly materials capable of preventing these problems.

A noteworthy eco-friendly material is cellulose. Cellulose is contained in cell walls of plants, secretion from microbes, mantles of sea squirts, etc., is the most common polysaccharide on earth, has biodegradability, high crystallinity, excellent stability and safety. Therefore, applying it to various fields is expected.

Cellulose is nearly insoluble in water and general solvent, because cellulose has strong intramolecular hydrogen bonds and high crystallinity. Therefore, studies on the improvement of the resolvability are made actively. Among them, a method where only the primary hydroxyl group at the C6 position among three hydroxyl groups which cellulose has is oxidized with TEMPO catalyst, and converted to a carboxyl group through an aldehyde group or a ketone group, is capable of oxidizing only the primary hydroxyl group selectively and performing the reaction under relatively mild conditions such as aqueous condition or room temperature. Therefore, this method attracted much attention recently. Furthermore, it is known that performing TEMPO oxidation with natural cellulose allows only the nano-order crystal surface to be oxidized keeping the crystallinity of cellulose, then only performing a slight mechanical process allow fine celluloses to water-disperse. In addition, a film formed by drying the water-dispersed fine celluloses is highly gas impermeable due to its fine structure and high crystallinity.

PTL1 discloses a gas barrier composite form which has a gas barrier layer on a base material, the gas barrier layer containing fine cellulose fibers.

PTL2 discloses that forming a fine cellulose fiber layer on a base material, furthermore forming a hydrophobizing material layer on them, and repeating these steps additionally once, twice or more allows a laminate to have a moisture barrier property.

CITATION LIST

Patent Literature

[PTL1] JP-A-2009-057552
[PTL2] JP-A-2010-155363

SUMMARY OF THE INVENTION

Problems to be Solved by the Invention

The invention described in PTL1 is an invention where a cellulose layer containing a fine cellulose is coated on a base material, and it is used as the gas barrier composite form. Fine cellulose dispersed liquid, however, is thick even at low solid content concentration, and the solid content concentration where fine celluloses can be nano-dispersed is about three percent. Therefore, increasing a drying temperature or an oven length for obtaining a desired dry film thickness by drying with water-based solvent might decrease productivity significantly. Furthermore, increasing solid content concentration might increase the viscosity of the dispersion liquid, impair coating activity, and cause uneven coating, shedding and so on.

In the invention described in PTL2, hydrophilic cellulose layers and hydrophobic hydrophobizing material layers are laminated alternatively. However, shedding and unevenness occurring during coating might prevent successful coating, because different kinds of polarity of coating liquid are applied. Furthermore, the laminated layers might break away because of bad interlayer adhesion. For example, when it is used as a gas barrier material, there are some problems such that continuous and uniform films cannot be formed because of shedding and unevenness, physical strength cannot be obtained because of bad adhesion, and so on, therefore, it is likely not to have enough performance as a gas barrier material.

In light of the above-described things, the object of the present invention is providing a laminate which prevents various negative effects by coating multiple times to form fine cellulose layers on a base material, and the method of manufacturing it.

Specifically, the objection of the present invention is providing the laminate formed by recoating to obtain desired film thickness, the manufacturing method of it, and the shaped container, which can increase drying efficiency of each dryer unit, and fill unevenness of coating and defects.

Means for Solving Problems

A first aspect of the invention is a laminate characterized by having at least a base material and two or more fine cellulose layers which contain fine celluloses having carboxyl groups. The two or more fine cellulose layers are stacked.

In a second aspect of the invention, in the laminate of the above aspect of the invention, carboxyl groups are introduced on crystalline surfaces of the fine celluloses; and the carboxyl concentration of the fine celluloses is 0.1 mmol/g or more, and 3.0 mmol/g or less.

In a third aspect of the invention, in the laminate of the above aspect of the invention, a number average fiber width of the fine celluloses is 1 nm or more, and 50 nm or less; and a number average fiber length of the fine celluloses is from not less than 100 to not larger than 10000 times the number average fiber width.

In a fourth aspect of the invention, in the laminate of the above aspect of the invention, any one of the fine cellulose layers contains an inorganic lamellar mineral.

In a fifth aspect of the invention, in the laminate of the above aspect of the invention, the fine cellulose layer, and furthermore a thin film layer consisting of metal or metal oxide are provided on at least a major surface of the base material.

In a sixth aspect of the invention, in the laminate of the above aspect of the invention, the fine cellulose layer, and furthermore a resin layer or a sealant layer are provided on at least a major surface of the base material.

In a seventh aspect of the invention, in the laminate of the above aspect of the invention, a thickness of the two or more stacked fine cellulose layers is 10 nm or more, and 10 µm or less.

In an eighth aspect of the invention, in the laminate of the above aspect of the invention, the base material is any one of polyesters, polyolefins, celluloses, polyamides, acryls, polystyrenes, polycarbonates, polyvinyl chlorides, polyurethanes, polyvinyl alcohols, paper, or derivatives or composites thereof.

In a ninth aspect of the invention, in the laminate of the above aspect of the invention, the laminate according to claim 8 is used.

A tenth aspect of the invention is a method for manufacturing a laminate, including: the step (1) for coating a base material with dispersed liquid which contains fine celluloses having carboxyl groups; the step (2) for drying the applied dispersed liquid to form a fine cellulose layer; and the step (3) for repeating the steps (1) and (2) to stack the fine cellulose layers.

Effects of the Invention

According to the present invention, obtaining the fine cellulose layer with desired film thickness by recoating allows the laminate, the manufacturing method of it and the container, which can increase dry efficiency of each dry unit, and fill unevenness of coating and defects, to be provided.

BRIEF DESCRIPTION OF THE DRAWINGS

In the accompanying drawings:

FIG. 1 is a schematic diagram showing of configurations of a laminate according to a second embodiment.

DESCRIPTION OF MODE FOR CARRYING OUT THE INVENTION

Hereinafter, details of the present invention are described.
1. First Embodiment
(About a Base Material of a Laminate)

The base material in the laminate of the present invention is any one of polyesters (polyethylene terephthalate, polyethylene naphthalate, polylactic acid, etc.), polyolefins (polyethylene, polypropylene, etc.), celluloses (cellulose, triacetylcellulose, etc.), polyamides (Nylon, etc.), acryls (polyacrylonitrile, etc.), polystyrenes, polycarbonates, polyvinyl chlorides, polyurethanes, polyvinyl alcohols, paper, or derivatives or composites thereof, etc. Especially, among the base material, the base material consisting of one of polyamide series, polyvinyl alcohol series and paper, a derivative or a composite of them, etc. has the capacity to swell easily. If it is used, coating the base material with fine cellulose dispersed liquid to form multiple layers for obtaining a desired film thickness can decrease residual stress in each layer after drying, and can prevent curling and shrinking.

The form of the base material is not limited in particular, if it is used as a sheet or a film, the thickness of the base material just has to be 10 µm or more, and 1000 µm or less. Especially, when it is used as a shaped container or packaging, it is preferred that the thickness is 10 µm or more, and 100 µm or less.

(A Fine Cellulose Layer in the Laminate and Manufacturing Methods of it)

It is preferred that the carboxyl group concentration of fine celluloses of the present invention is 0.1 mmol/g or more, and 3.0 mmol/g or less. It is more preferable that the carboxyl concentration of fine celluloses of the present invention is 0.5 mmol/g or more, and 2.0 mmol/g or less. If the carboxyl group concentration is smaller than 0.1 mmol/g, it is hard to disperse fine celluloses uniformly because of poor electrostatic repulsion. If the carboxyl concentration is larger than 3.0 mmol/g, crystallinity is likely to be impaired.

It is preferred that the number average fiber width of fine celluloses is 1 nm or more, and 50 nm or less, and that the number average fiber length is from not less than 100 to not larger than 10000 times the number average fiver width. If the number average fiber width is smaller than 1 nm, the cellulose does not form nanofibers, and if the number average fiber width exceeds 50 nm, transparency of the dispersed liquid decreases. Furthermore, if the number average fiber length is smaller than 100 times the number average fiber width, the strength of cellulose films is likely to decrease. If the number average fiber length exceeds 10000 times the number average fiber width, the viscosity of the dispersed liquid is too high, which causes a problem in coating activity.

Methods for manufacturing a carboxyl group-containing fine cellulose layer of the present invention are described.

The carboxyl group-containing fine cellulose layer used in the present invention is obtained by a step for oxidizing cellulose, a step for refining to make the coating liquid, and a step for coating.

(Step for Oxidizing Cellulose)

As raw materials of cellulose to be oxidized, wood pulp, non-wood pulp, recycled pulp, cotton, bacterial cellulose, valonia cellulose, ascidian cellulose, fine celluloses, microcrystal cellulose, etc. may be used.

As a method for reforming cellulose, a method where a co-oxidant is used under aqueous and relatively mild conditions, in the presence of N-oxyl compound which is highly selective for oxidation of primary hydroxyl groups, keeping the structure possibly is preferred. As the above-described N-oxyl compound, besides 2,2,6,6-tetramethylpiperidine-1-oxyl (TEMPO), for example, 2,2,6,6-tetramethylpiperidine-N-oxyl, 2,2,6,6-tetramethyl-4-hydroxypiperidine-1-oxyl, 2,2,6,6-tetramethyl-4-phenoxypiperidine-1-oxyl, 2,2,6,6-tetramethyl-4-benzylpiperidine-1-oxyl, 2,2,6,6-tetramethyl-4-acryloyloxypiperidine-1-oxyl, 2,2,6,6-tetramethyl-4-methacryloyloxypiperidine-1-oxyl, 2,2,6,6-tetramethyl-4-benzoyloxypiperidine-1-oxyl, 2,2,6,6-tetramethyl-4-cinnamoyloxypiperidine-1-oxyl, 2,2,6,6-tetramethyl-4-acetylaminopiperidine-1-oxyl, 2,2,6,6-tetramethyl-4-acetylaminopiperidine-1-oxyl, 2,2,6,6-tetramethyl-4-acryloylaminopiperidine-1-oxyl, 2,2,6,6-tetramethyl-4-methacryloylaminopiperidine-1-oxyl, 2,2,6,6-tetramethyl-4-benzoylaminopiperidine-1-oxyl, 2,2,6,6-tetramethyl-4-cinnamoylaminopiperidine-1-oxyl, 4-propionyloxy-2,2,6,6-tetramethylpiperidine-N-oxyl, 4-methoxy-2,2,6,6-tetramethylpiperidine-N-oxyl, 4-ethoxy-2,2,6,6-tetramethylpiperidine-N-oxyl, 4-acetamido-2,2,6,6- tetramethylpiperidine-N-oxyl, 4-oxo-2,2,6,6-tetramethylpiperidine-N-oxyl, 2,2,4,4-tetramethylazetidine-1-oxyl, 2,2, -dimethyl-4,4-dipropylazetidine-1-oxyl, 2,2,5,5-tetramethylpyrrolidine-N-oxyl, 2,2,5,5-tetramethyl-3-oxopyrrolidine-1-oxyl, 2,2,6,6-tetramethyl-4-acetoxypiperidine-1-oxyl, di tert-butylamine-N-oxyl, and, poly[(6-[1,1,3,3-tetramethylbutyl]amino)-s-triazine-2,4-diyl][(2,2,6,6-tetramethyl-4-piperidyl)imino]hexamethylene [(2,2,6,6-tetramethyl-4-piperidyl)imino are suitable. 2,2,6,6-Tetramethyl-1-piperidine-N-oxyl etc. is preferably used.

As the above-described co-oxidant, any co-oxidant such as halogen, hypohalous acid, halous acid, perhalous acid, salt of them, halogen oxide, nitrogen oxide and peroxide, which has the capacity to promote an oxidation reaction can be used. Sodium hypochlorite is preferred for reasons of availability and reactivity.

Furthermore, if performed under coexistence of bromide or iodide, oxidation reaction can be advanced smoothly, which can improve efficiency of carboxylation.

As the N-oxyl compound, TEMPO is preferred, only an amount required for it to function as a catalyst is needed. As bromide, the system using sodium bromide or lithium bromide is preferred, and the sodium bromide is more preferable in view of cost and stability. Only an amount required for co-oxidant, bromide or iodide to promote the oxidation reaction is used. It is more preferable that the reaction is performed at pH 9 or more, and pH11 or less. As the oxidation proceeds, carboxyl groups are generated, which decreases pH of the system. Therefore, the system needs to be kept at pH 9 or more, and pH11 or less.

For keep the system alkaline, alkali water solution is added with pH kept constant. As aqueous alkali solution, sodium hydroxide, lithium hydroxide, potassium hydroxide, ammonia water solution, or organic alkali such as tetramethylammonium hydroxide, tetraethylammonium hydroxide, tetrabuthylammonium hydroxide and benzyltrimethylammonium hydroxide is used. Sodium hydroxide is preferable in view of cost etc.

For terminating the oxidation reaction, it is necessary to add alcohol keeping pH of the system for co-oxidant to finish reacting perfectly. As alcohol to be added, low-molecular-weight alcohol such as methanol, ethanol and propanol is preferred for terminating the reaction quickly. Ethanol is more preferable in view of safety of a by-product generated with the reaction etc.

As methods for washing oxidized cellulose which has finished being oxidized, a method for washing the oxidized cellulose which keeps forming salts with an alkali, a method where acid is added to convert the oxidized cellulose into carboxylated form then the oxidized cellulose is washed, a method where organic solvent is added for insolubilization and then the oxidized cellulose is washed, etc. are suitable. The method where acid is added to carboxylate the oxidized cellulose then the oxidized cellulose is washed is preferable in view of the handling ability and the yield etc. As washing solvent, water is preferable.

(Step for Refining to make the Coating Liquid)

As methods for refining the oxidized cellulose, at first, the oxidized cellulose is suspended in water, various organic solvent such as alcohol, or mixed solvent of them. If needed, for increasing dispersibility, pH control of the dispersed liquid may be performed. As alkali water solution used for the pH control, sodium hydroxide, lithium hydroxide, potassium hydroxide, ammonia water solution, and organic alkali such as tetramethylammonium hydroxide, tetraethylammonium hydroxide, tetrabuthylammonium hydroxide and benzyltrimethylammonium hydroxide are given. Sodium hydroxide is preferable in view of cost and availability etc.

Next, as a method for disentangling fibers, by using a high-pressure homogenizer, a ultrahigh-pressure homogenizer, a ball mill, a roll mill, a cutter mill, a planetary mill, a jet mill, an attritor, a grinder, a juicer-mixer, a homomixer, ultrasonic homogenizer, a nanogenizer and an aqueous counter collision, etc., the oxidized cellulose can be refined. By executing these refining processes for a suitable of time or a suitable number of the refining processes, water solution where fine celluloses having carboxyl groups at C6 positions are dispersed can be obtained.

The fine cellulose dispersed liquid, as necessary, without undermining the efficacy of the present invention, may include components other than cellulose and components used for the pH control. The other components are not limited especially, and can be selected from public known additives depending on usage of the fine cellulose layer etc. Specifically, an organic metallic compound such as alkoxysilane, a hydrolysate of an organic metallic compound, an inorganic lamellar compound, an inorganic acicular mineral, a leveling agent, an antifoaming agent, a water-soluble high molecular-weight molecule, a synthetic polymer, an inorganic particle, an organic particle, a lubricant, an antistat, an ultraviolet absorber, dye, pigment, a stabilizer, magnetic powder, an orientation accelerator, a plasticizer, and a cross-linker etc. are suitable. Among them, an inorganic lamellar compound is preferable, because it promotes the planar orientation of films, and improves water resistance, humidity resistance, and gas barrier property etc.

The inorganic lamellar compound is a crystalline inorganic compound having layered structure. As long as the inorganic lamellar compound, its kind, grain size, aspect-ratio and so on are not limited especially, it can be selected arbitrarily depending on purpose of use etc. As the inorganic lamellar compound, specifically, for example, clay mineral typified by kaolinite group, smectite group and mica group etc. is suitable. Among them, as the inorganic lamellar compound of smectite group, montmorillonite, hectorite, and saponite etc. are suitable. Among them, montmorillonite is preferable in view of dispersing stability in composition and coating activity of composition etc.

The inorganic lamellar compound may be dispersed directly into aqueous dispersed liquid, or may be added after dispersing in aqueous medium such as water preliminarily.

It is preferred that inorganic lamellar minerals ranging from not less than 0.1 to not larger than 50 mass % are added to the fine celluloses.

(Step for Coating with the Fine Cellulose Dispersed Liquid)

In methods for coating with the cellulose dispersed liquid of the present invention to form multiple layers, a comma coater (Trade mark), a roll coater, a reverse roll coater, a direct gravure coater, a reverse gravure coater, an offset gravure coater, a roll kiss coater, a reverse kiss coater, a micro gravure coater, an air doctor coater, a knife coater, a bar coater, a wire bar coater, a die coater, a dip coater, a blade coater, a brush coater, a curtain coater, a die slot coater etc., or a combination of two or more of them can be used. The coating method is not limited to one of a batch type and a continuous type.

At multi-layer coating with the fine cellulose dispersed liquid, a component composition and a film thickness ratio of each layer are not limited especially, and the cellulose layers only have to include fine celluloses and have an intended layer thickness (10 nm or more, and 10 µm or less). When the base material consisting of one of polyamide series, polyvinyl alcohol series and paper, a derivative or a composite of them, which have the capacity to swell easily, is used, for preventing swelling of the base material due to the fine cellulose dispersed liquid, it is preferable that the film thickness of a first fine cellulose layer formed by coating the surface of the base material directly is about 10 nm to 1 μm, inclusive. Similarly, it is preferable that the film thickness of a second fine cellulose layer formed by coating the surface of the first fine is about 10 nm to 1 μm, inclusive. Subsequently, more layers can be added, can be made arbitrarily depending on the intended oxygen barrier property and behavior of the base material.

In addition, when multi-layer coating with the fine cellulose dispersed liquid is performed, for improving performances, a thin film layer consisting of metal and metallic oxide, an anchor/primer layer, an antifouling layer, a print layer, an antistatic layer and so on may be included between any layers of a laminate. Though the type of each layer is not limited especially, if used as the laminate or the gas barrier material according to the present invention, aluminum, aluminum oxide, silica etc. are prederable for the types of the metal or metal oxide.

(Step for Stacking Thermoplastic Resin)

A resin layer or sealant layer is not limited especially, but is, for example, polypropylene film such as unstretched polypropylene film, and polyethylene film such as low-density polyethylene film and linear low-density polyethylene film. The thermoplastic resin is usually stacked through an adhesive layer.

The laminate according to the present invention is used in various films, sheets, furthermore, various containers such as a bottle, a cylinder and a box. It is also suitable for packaging materials.

EXAMPLES

Hereinafter, the present invention is described in detail on the basis of examples, however the scope of the present invention is not limited to these embodiments.

<TEMPO Oxidation of Cellulose>

30 g soft wood bleached kraft pulp was suspended into 1800 g distilled water, then solution where 0.3 g TEMPO and 3 g sodium bromide were dissolved in 200 g distilled water was added to it, and then it was cooled until 15° C. 172 g aqueous solution of sodium hypochlorite, which is 2 mol/l and 1.15 g/ml in density was added here by drops, which started the oxidation reaction. The system was always kept at 20° C. in temperature, and at pH10 against decrease in pH during the reaction by adding 0.5 N aqueous solution of sodium hydroxide. When sodium hydroxide in the mass of cellulose reached 2.85 mmol/g, enough ethanol was added to stop the reaction. Then, after adding hydrochloric acid until it became pH 3, washing with distilled water was repeated enough, then oxidized pulp was obtained.

Measurement of Carboxyl Groups in the Oxidized Pulp 0.1 g in solid weight oxidized pulp and reoxidized pulp which was obtained by the TEMPO oxidation was taken, dispersed in water to be 1 percent concentration, and made to be pH 3 by adding hydrochloric acid. Then, the carboxyl group concentration (mmol/g) was determined by conductometric titration with 0.5 N sodium hydroxide. The result was 1.6 mmol/g.

<Refining of Oxidized Pulp>

Manufacturing Example 1

1 g oxidized pulp obtained by the above-described TEMPO oxidation was dispersed in 99 g distilled water, it was prepared to be pH 10 by using sodium hydroxide. The refining process of the prepared dispersed liquid was executed with a juicer-mixer for 60 minutes, 1% fine cellulose water-dispersed liquid was obtained.

Manufacturing Example 2

0.7 g oxidized pulp obtained by the above-described TEMPO oxidation and 0.3 g inorganic lamellar mineral (montmorillonite) were dispersed in 99 g distilled water, it was prepared to be pH 10 by using sodium hydroxide. The refining process of the prepared dispersed liquid was executed with a juicer-mixer for 60 minutes, 1% fine cellulose+inorganic lamellar mineral water-dispersed liquid was obtained.

Observation of Form

The form of the above-described fine cellulose was observed with an atomic force microscopy (AFM). 1000-fold dilution of the 1% fine cellulose water-dispersed was cast on a cleavage plane of mica, it was dried, and observed with the AFM in tapping mode (Trade Mark). In the observation, fiber heights at ten points were measured, an average of them was the number average fiber width. In addition, fiber lengths were similarly observed with the AFM in tapping mode, ten points of the longitudinal lengths of fibers were measured, and an average of them was the number average fiber length. The number average fiber width was 3.5 nm, and the number average fiber length was 1.3 μm.

Example 1 and 2

PET (25 μm) was used as the base material, the water-dispersed liquid prepared in the above-described manufacturing example 1 or 2 was coated with using a bar coater to form 0.5 μm dry film thickness, it was sufficiently dried, the water-dispersed liquid was similarly coated onto it with to form 0.5 μm dry film thickness, it was sufficiently dried, and laminates of Example 1 and 2, having the fine cellulose layers of 1 μm dry film thickness, was made.

Examples 3 and 4

PET (25 μm) was used as the base material, the water-dispersed liquid prepared in the above-described manufacturing example 1 or 2 was coated with using a bar coater to form 0.25 μm dry film thickness, it was sufficiently dried, the water-dispersed liquid was similarly coated onto it with to form three layers each having 0.25 μm dry film thickness, it was sufficiently dried, and laminates of Examples 3 and 4, having the fine cellulose layers of 1 μm dry film thickness, were made.

Examples 5 to 8

50 nm silicon oxide film was stacked on the fine cellulose layers of the above-described Examples 1 to 4 by vacuum vapor deposition, laminates of Examples 5 to 8 were made.

Examples 9 to 16

70 μm unstretched polypropylene film (CPP) was stuck to each coating surface side of each laminate of Examples 1 to 8 by using a urethane polyol based adhesive in a dry laminating process, each laminate of Examples 9 to 16 was made.

Comparative Example 1

PET (25 μm) was used as the base material, the water-dispersed liquid prepared in the above-described manufacturing example 1 was coated with using a bar coater to form 1 μm dry film thickness, it was sufficiently dried, then a laminate of Comparative example 1, having the fine cellulose layer, was made.

Comparative Example 2

70 μm unstretched polypropylene film (CPP) was stuck to the coating surface side of the laminate of Comparative example 1 by using a urethane polyol based adhesive in a dry laminating process, then a laminate of Comparative example 2 was made.

Evaluation of Drying Speed

In Examples 1 to 4 and coating with the fine cellulose layer according to Comparative example 1, required times until drying at 100° C. in an oven was finished were shown in Table 1.

Evaluation of Unevenness of Coating

About Examples 1 to 4 and Comparative example 1, the asperity on the surface of the fine cellulose layers of 1 μm dry film was measured with a non-contact surface and layer cross-sectional face measurement system (Ryoka Systems Inc.). Table 1 shows the results.

Measurement of Oxygen Transmittance

Oxygen transmittance ($cm^3/m^2 \cdot day$) of each laminate of the above-described Examples 1 to 16, and Comparative example 1 and 2 was measured under an atmosphere of 30 to 70% RH using the oxygen transmittance measuring device (MOCON OX-TRAN 2/21 made by Modern Controls Inc.). Table 2 shows the results.

|  | Drying time (second) | Depth of asperity on the surface (nm) |
| --- | --- | --- |
| Example 1 | 155 | 90 |
| Example 2 | 149 | 120 |
| Example 3 | 81 | 70 |
| Example 4 | 75 | 90 |
| Comparative example 1 | 305 | 180 |
| Comparative example 2 | 297 | 200 |

|  | Oxygen transmittance ($cm^3/m^2 \cdot day$) |
| --- | --- |
| Example 1 | 53 |
| Example 2 | 7 |
| Example 3 | 45 |
| Example 4 | 3 |
| Example 5 | 1.7 |
| Example 6 | 0.3 |
| Example 7 | 0.9 |
| Example 8 | 0.2 |
| Example 9 | 48 |
| Example 10 | 3 |
| Example 11 | 40 |
| Example 12 | 2 |
| Example 13 | 1.5 |
| Example 14 | 0.2 |
| Example 15 | 0.7 |
| Example 16 | 0.1 |
| Comparative example 1 | 70 |
| Comparative example 2 | 63 |
| Comparative example 3 | 58 |
| Comparative example 4 | 11 |

As shown in the results of Table 1, forming the fine cellulose layers by applying the multi-layer coating can increase the drying speed, furthermore, can decrease unevenness of coating. In addition, as shown in Table 2, this can make the gas barriers highly effective, furthermore, laminating the evaporated layer or the sealant layer can make the gas barriers more highly effective.

2. Second Embodiment

Hereinafter, the second embodiment is described, referring to FIG. 1. FIG. 1 shows configurations of the laminate 10 according to the second embodiment. The laminate 10 has a base material including a pair of main surfaces on its top side and down side, a first layers assembly is disposed on one of the main surfaces, and a second layers assembly is disposed on the other, as shown in FIG. 1. The first assembly of layers includes two or more fine cellulose layers 12, and a resin or sealant layer 13. The second assembly of layers includes two or more fine cellulose layers 12, and a thin film layer 14 consisting of metal or metal oxide. The two or more fine cellulose layers 12 in each of the first and second assembly are stacked directly, that is to say, at least one of the two or more fine cellulose layers is disposed on another or the fine cellulose layers assembly. It is desirable that the thickness of the stack of the two or more cellulose is 10 nm or more, and 10 μm or less.

Other points, for example compositions of the base material 11, the resin or sealant layer 13 and the thin film layer 14, manufacturing method of the fine celluloses and fine cellulose layers, and the definition of fine celluloses, is the same as the first embodiment.

The invention claimed is:

1. A method for manufacturing a laminate, comprising:
   applying, directly to a base material, dispersed liquid which contains a first fine cellulose having carboxyl groups, by coating;
   drying the applied dispersed liquid on the base material to form a first fine cellulose layer; and
   applying dispersed liquid, which contains a second fine cellulose having carboxyl groups, directly on the first fine cellulose layer by coating to form a second fine cellulose layer layered directly on the first fine cellulose layer, wherein
   the first fine cellulose layer has a surface, opposite the second fine cellulose layer, in contact with the base material;
   the first and second fine celluloses having carboxyl groups are prepared by introducing carboxyl groups on crystalline surfaces of fine cellulose;
   the first fine cellulose having carboxyl groups has a carboxyl group concentration that is 0.1 mmol/g or more, and 3.0 mmol/g or less, and the second fine cellulose having carboxyl groups has a carboxyl group concentration that is 0.1 mmol/g or more, and 3.0 mmol/g or less;
   the first and second fine celluloses having carboxyl groups have an average fiber width of 1 nm or more, and 50 nm or less; and
   the first and second fine celluloses having carboxyl groups have an average fiber length ranging from not less than 100 to not more than 10000 times the average fiber width.

2. A method for manufacturing a laminate according to claim 1, wherein
   any one of the first and second fine cellulose layers contains an inorganic lamellar mineral.

3. A method for manufacturing a laminate according to claim 2, further comprising:
   forming a metal film layer consisting of a metal oxide to form a laminate portion having the first fine cellulose layer, the second fine cellulose layer and the metal film layer, the laminate portion being disposed on a surface of the base material.

4. A method for manufacturing a laminate according to claim 3, further comprising:

forming a second laminate portion having a third fine cellulose layer, a fourth fine cellulose layer, and the a resin layer or sealant layer, the second laminate portion being disposed on a surface of the base material.

5. A method for manufacturing a laminate according to claim 4, wherein each of the first and second fine cellulose layers has a thickness of 10 nm or more, and 10 µm or less.

6. A method for manufacturing a laminate according to claim 5, wherein the base material is any one of polyesters, polyolefins, celluloses, polyamides, acryls, polystyrenes, polycarbonates, polyvinyl chlorides, polyurethanes, polyvinyl alcohols, paper, or derivatives or composites thereof.

7. A method for manufacturing a laminate according to claim 1, further comprising:

forming a metal film layer consisting of a metal oxide to form a laminate portion having the first fine cellulose layer, the second fine cellulose layer and the metal film layer, the laminate portion being disposed on a surface of the base material, the second fine cellulose layer having a surface in contact with the metal film layer.

8. A method for manufacturing a laminate according to claim 1, further comprising:

forming a resin layer or a sealant layer to form a laminate portion having the first fine cellulose layer, the second fine cellulose layer and the resin layer or sealant layer, the laminate portion being disposed on a surface of the base material, the second fine cellulose layer having a surface in contact with the resin layer or the sealant layer.

9. A method for manufacturing a laminate according to claim 1, wherein each of the first and second fine cellulose layers has a thickness of 10 nm or more, and 10 µm or less.

10. A method for manufacturing a laminate according to claim 1, wherein the base material is any one of polyesters, polyolefins, celluloses, polyamides, acryls, polystyrenes, polycarbonates, polyvinyl chlorides, polyurethanes, polyvinyl alcohols, paper, or derivatives or composites thereof.

* * * * *

UNITED STATES PATENT AND TRADEMARK OFFICE
CERTIFICATE OF CORRECTION

PATENT NO. : 9,950,846 B2  
APPLICATION NO. : 14/030568  
DATED : April 24, 2018  
INVENTOR(S) : Mitsuharu Kimura et al.

Page 1 of 1

It is certified that error appears in the above-identified patent and that said Letters Patent is hereby corrected as shown below:

In the Claims

Column 11, Line 7:
In Claim 4, delete "the a" and insert -- a --, therefore.

Signed and Sealed this  
Thirty-first Day of July, 2018

Andrei Iancu  
*Director of the United States Patent and Trademark Office*